Aug. 21, 1934.  E. W. HUNTER  1,971,222
CORN CLEAVER
Filed Oct. 18, 1933
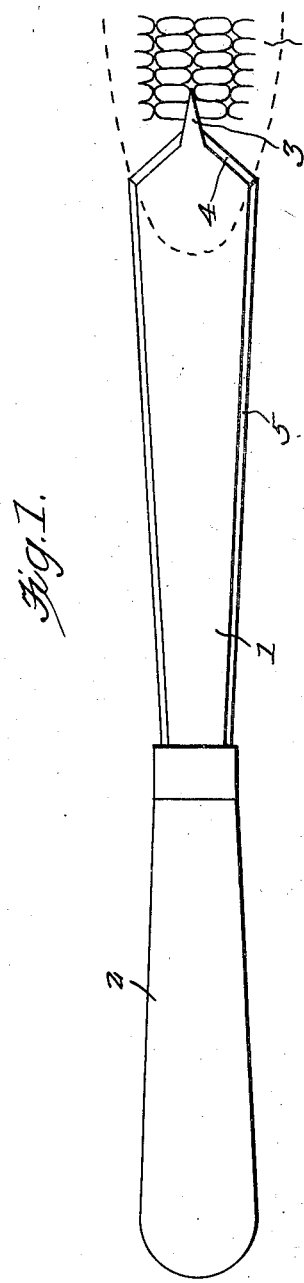
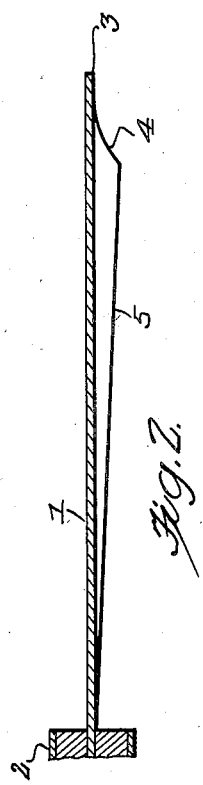
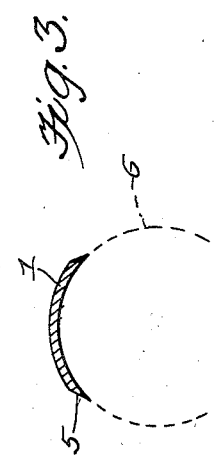
Inventor
Eugene W. Hunter,
By (signature)
Attorney Patented Aug. 21, 1934

1,971,222

UNITED STATES PATENT OFFICE 1,971,222

CORN CLEAVER

Eugene W. Hunter, Lyndonville, Vt.

Application October 18, 1933, Serial No. 694,162

1 Claim. (Cl. 146—4)

This invention relates to a corn cleaver, the general object of the invention being to provide a device for removing kernels from the cob of ear corn.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a view showing how the device is used to remove the kernels from the cob.

Figure 2 is a longitudinal sectional view through the blade of the device and through a part of the handle.

Figure 3 is a transverse sectional view showing how the blade fits the ear of corn.

In this drawing, the numeral 1 indicates the blade and the numeral 2 the handle which is suitably connected to one end of the blade. As shown, the blade is of elongated form and gradually decreases in width from its free end to the handle end and the blade is also of arc shape, with the arc portion gradually merging into the flat part at the handle. The free end of the blade has a tapered point 3 at the center thereof with parts sloping outwardly and rearwardly from said point, as shown at 4, these parts being beveled, with the bevel sloping from the concaved face to the convex face and the side edges of the blade are also beveled in the same direction, as shown at 5.

As will be seen from Figure 3, the concaved face of the blade is placed against the ear which is shown in dotted lines at 6 and then the device is pushed along the ear, as shown in Figure 1, with the point entering the space between the two rows of kernels so that this point acts as guiding means. The beveled edges 4 will cut the kernels from the cob close to the cob, so that practically all the kernels are removed in whole condition from the cob.

The beveled edges 5 can be used for scraping the cob to remove loose kernels therefrom. By beveling the free end of the device, as shown at 4, this end is automatically drawn into the corn as it is pushed along the cob, instead of having a tendency to run out of the kernels as it would if the bevel was in the opposite direction.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

A device of the class described comprising a handle, an elongated blade connected with the handle and of arc shape in cross section, the free end of the blade being of substantially V-shape with a point at the apex of the V, the walls formed by the V-shaped part diverging toward the handle and said walls being beveled from the concave face rearwardly to the convex face and the point having its side walls diverging toward the handle, the side edges of the blade being beveled to provide a cutting edge at each edge of the concave face.

EUGENE W. HUNTER.